Jan. 10, 1928.

Re. 16,849

D. H. DANLEY

ACETYLENE GAS GENERATOR

Original Filed April 7, 1924 2 Sheets-Sheet 1

INVENTOR.

Dayton H. Danley

BY

Alexander & Dowell

ATTORNEYS

Jan. 10, 1928.

Re. 16,849

D. H. DANLEY

ACETYLENE GAS GENERATOR

Original Filed April 7, 1924 2 Sheets-Sheet 2

INVENTOR.
Dayton H. Danley
BY
Alexander & Farrell
ATTORNEYS

Reissued Jan. 10, 1928.

Re. 16,849

UNITED STATES PATENT OFFICE.

DAYTON HERSCHEL DANLEY, OF LEBANON, INDIANA.

ACETYLENE-GAS GENERATOR.

Original No. 1,569,722, dated January 12, 1926, Serial No. 704,834, filed April 7, 1924. Application for reissue filed August 6, 1927. Serial No. 211,242.

This invention relates to acetylene gas generators and has for its object the provision of a generator so constructed and arranged as to be automatically self adjusting in the matter of pressure so that a uniform flow at a certain predetermined pressure may be had.

Another object is the provision of a generator provided with means whereby the generation may be accelerated, retarded or cut off at will with the utmost ease.

A further object is the provision of a device of this character constructed and arranged to use carbide in cake form, a magazine being provided wherein a large quantity may be stored and automatically fed to the water whereby the device will be capable of prolonged use without replenishing the supply of material.

An additional object is the provision of a device of this character which will be simple and inexpensive in manufacture, easy to use, and control, positive in action, efficient and durable in service and a general improvement in the art.

With the above and other objects and advantages in view the invention consists in the details of construction to be hereinafter more fully described and claimed and illustrated in the accompanying drawings, in which:

Figure 1:
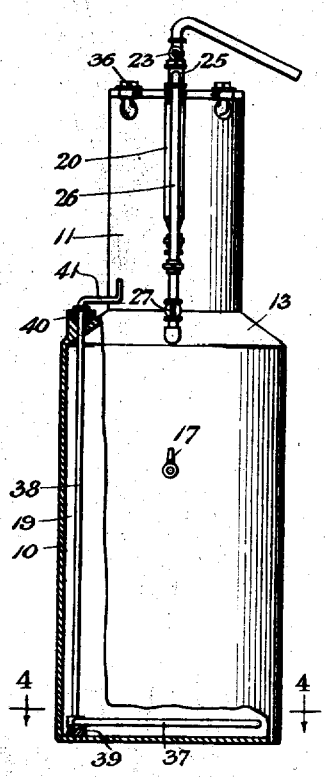
Figure 1 is a side elevation of the device partly broken away and in section.
Figure 2:
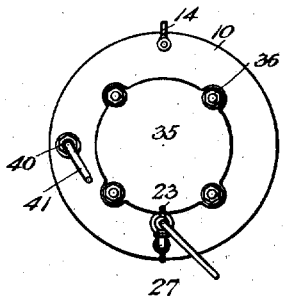
Fig. 2 is a top plan view.
Figure 4:
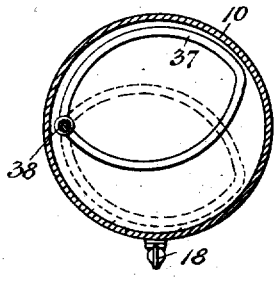
Figure 4 is a cross section on the line 4—4 of Figure 1.
Figure 3:
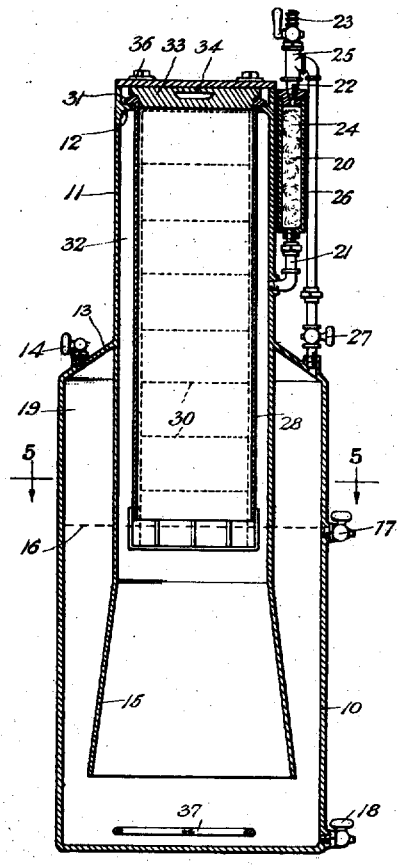
Figure 3 is a central longitudinal section.
Figure 5:
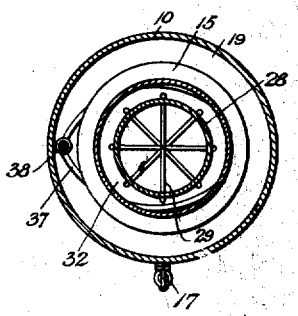
Figure 5 is a cross section on the line 5—5 of Figure 3.
Figure 6:
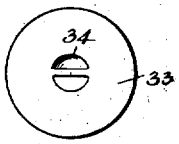
Figure 6 is a plan view of the magazine cover.

Referring more particularly to the drawings the numeral 10 designates an upright elongated tank of suitable size and shape, the size depending of course on the character of the work in which the generator is to be used. Within this tank and projecting considerably above the top thereof is a shell 11 formed near its upper end with an inwardly extending ledge 12 for a purpose to be described. The top of the tank 10 is connected with the shell 11 by a wall 13 in which is located a vent valve 14 for a purpose to be described. The lower end of the shell 11 extends considerably down into the tank 10 and is flared outwardly as indicated at 15. The tank 10 is designed to contain water to the level indicated by the line 16 and at this level is provided a drain valve 17 so that after the tank is filled with water it may be permitted to drain out to the proper level as indicated, after which the valve 17 would of course be closed. At the very bottom of the tank is a drain valve 18 so that the water may be drawn out when desired. The space 19 between the tank 10 and shell 11 is used for confining pressure, and when the device is first started contains only air under pressure.

Mounted at one side of the upper portion of the shell is a filtering device including an elongated casing 20 into the lower end of which leads a pipe 21 communicating with the interior of the shell, and leading from the top of this casing is an outlet pipe 22 provided with a control valve 23. The filtering medium may conveniently be hair indicated at 24, though it is obvious that some other material may be used if preferred. Interposed in the pipe 22 is a T 25 to which is connected a pipe 26 connected with the tank 10 at the wall 13 thereof and communicating with the compartment 19. In this pipe 26 is a control valve 27.

The numeral 28 represents an elongated magazine which has a cage bottom 29 and which contains carbide cakes indicated at 30. This magazine is arranged within the shell 11 and is formed with an outstanding flange 31 which rests upon the ledge 12. The length of this magazine is such that the lowermost cake therein will be about one-third submerged in the water when the latter is at the level indicated by the line 16. The magazine is of considerably less diameter than the shell 11 so as to provide an annular space 32 through which the gas generated may rise. The upper end of the magazine is closed by a cover 33 having a finger hold 34 and this cover is held in place by a cap plate 35 engaged upon the upper end of the shell and held by studs 36.

For agitating any sludge which accumulates in the bottom of the tank, I provide a stirrer 37 on the lower end of a rod 38 which is journaled in a step bearing 39 and through a packed bearing 40 in the wall 13, the upper end of this rod terminating in a crank handle 41.

In order to start the generator, the studs 36 must be removed, the cap 35 taken off and the cover 33 also removed so that the carbide holder or magazine 28 may be removed. The tank is filled with water to the level 16 and the magazine is filled with the carbide cakes 30. The magazine cover, plate and studs are then replaced. The valve 25 should be closed and the valve 14 opened. The lowermost cake is wetted only slightly for the reason that the pressure of gas generated almost instantly upon contact of the water with the cake will force the water down entirely or at least partly out of the lower end 15 of the shell so that the generation will stop. The valve 14 is then closed and while the generation continues slightly there is only a small pressure.

In order to start the generation to its proper extent so as to increase the pressure, the valve 27 should be opened. The pressure is then equalized inside and outside of the shell 11. The water rises in the shell until it reaches the level 16 and the lowermost cake is again subjected to the action of the water. The water level will remain at this point until the valve 27 is closed. Upon closing this valve, the generation will continue for an instant but is discontinued very shortly owing to the fact that the increased pressure within the shell again drives the water downwardly. To obtain a flow of gas, the valve 23 is opened and the torch or other device using the gas is lighted in order to ascertain whether or not the proper pressure is being furnished thereto. If the pressure is too high, it may be relieved by opening the valve 14 for an instant and if the pressure is too low, the valve 27 should be opened. As soon as the flame of the burning gas is of the proper length or character, the valve 27 should be closed and the flame will continue and be uniform until the cakes are exhausted. When the torch is shut off the water level lowers and generation stops. However, the gas being under pressure in the compartment 19 is always ready to force the water up into the shell by simply opening the valve 23. The filtering medium 24 acts to catch any water or moisture which may bubble out with the gas so that there will be no clogging of the burners. The sludge accumulating in the bottom of the tank may be agitated by turning the crank 41 and draining of the whole device is effected through the valve 18.

While I have shown and described the preferred embodiment of my invention it is of course to be understood that I reserve the right to make such changes in the form, construction and arrangement of parts as will not depart from the spirit of the invention or the scope of the subjoined claims.

In my generator I have full control over generation, because the carbide is held in one positive position, and the water is controlled by pressure down away from the carbide, when torch is not in use. Any possible chance of carbide accidentally being dumped into the bottom is positively impossible, unless the generator is laid over on its side and then the carbide is still in the basket and as soon as the generator is set upright again it will right itself.

I claim:

1. In a device of the character described, an upright tank adapted to contain water formed with a neck portion of reduced diameter extending upwardly beyond the top to a considerable extent, said neck portion having a depending extension located within the tank, a magazine suspended within said neck and depending extensions in spaced relation to the walls thereof and adapted to contain carbide in caked form, a closure member for said magazine, a cap for closing said neck and acting to retain the magazine closure in position, an elongated upstanding cylinder mounted beside the neck at the upper portion thereof and containing filtering material, a pipe leading from the upper portion of said tank and provided with a control valve, an outlet valve connected with the top of said cylinder connected with the bottom thereof and connected with the lower portion of the neck to communicate with the space between the neck and the magazine.

2. In a device of the character described, an upright tank adapted to contain water formed with a neck portion of reduced diameter extending upwardly beyond the top of the tank, said neck portion having a depending extension located within the tank, a magazine within said neck portion in spaced relation to the walls thereof and adapted to contain carbide, a closure for closing said neck portion, a casing mounted beside the neck at the upper portion thereof, a pipe leading from the upper portion of said tank and communicating with said casing and provided with a control valve, an outlet valve connected with the said casing, and an intake pipe for said casing connected with the space between the neck and the magazine.

3. A carbide generator of the character specified; comprising a tank adapted to contain water, a neck portion extending upwardly beyond the top of the tank and having an extension depending within the tank below the top, a closure for said neck portion, a carbide magazine in said neck portion adapted to contain carbide, a casing for purifying the gas, a pipe connecting the gas chamber in the upper portion of said tank exterior to said neck portion with the gas chamber in the neck portion, a control valve for said pipe, a gas intake for said casing connected with the gas chamber in the neck portion, and a gas outlet connected with the said casing.

4. An acetylene gas apparatus comprising a tank, a neck portion depending into the tank and spaced therefrom, said tank being adapted to contain water in its lower portion; the space between the neck portion and the tank forming a gas holding pressure chamber; a carbide magazine within the neck portion and depending below the top of the tank, the space between the magazine and neck portion forming a gas generating and storing chamber; means for closing the neck portion; normally closed means for establishing communication between the gas generating chamber in the neck portion and the gas pressure chamber in the tank whereby when communication is established between the gas chamber in the neck portion and the gas pressure chamber in the tank, the water will reach a common level in both the neck portion and tank; and an outlet pipe for the gas in the chamber in the neck portion whereby when said communication means is closed and the said outlet pipe closed the pressure in the neck portion will lower the water out of contact with the carbide; and when the gas outlet is opened the gas pressure in the tank chamber will cause the water to rise in the neck portion as the carbide is exhausted.

5. An acetylene gas apparatus comprising a tank adapted to contain water in its lower portion; a neck portion depending into the tank and spaced therefrom and having its lower end open and submerged, the space between the upper part of the neck portion and the tank forming a gas holding chamber; a carbide magazine within the neck portion and depending below the top of the tank, the space between the magazine and neck portion forming a gas generating and storing chamber; means for closing the neck portion; normally closed means for establishing communication between the gas generating chamber in the neck portion and the gas pressure chamber in the tank including a casing for purifying the gas and pipes connecting the casing with the gas holding chamber in the neck portion and with the gas holding chamber in the tank whereby when communication is established between the gas chamber in the neck portion and the gas pressure chamber in the tank the water will reach a common level in both the neck portion and tank, and a gas outlet from said casing whereby when said communication is closed and the gas outlet closed the pressure in the neck portion will lower the water out of contact with the carbide, and when the gas outlet is opened the pressure of gas in the tank chamber will cause the water to rise in the neck portion as the carbide is exhausted.

DAYTON HERSCHEL DANLEY.